United States Patent Office 3,147,834
Patented Sept. 8, 1964

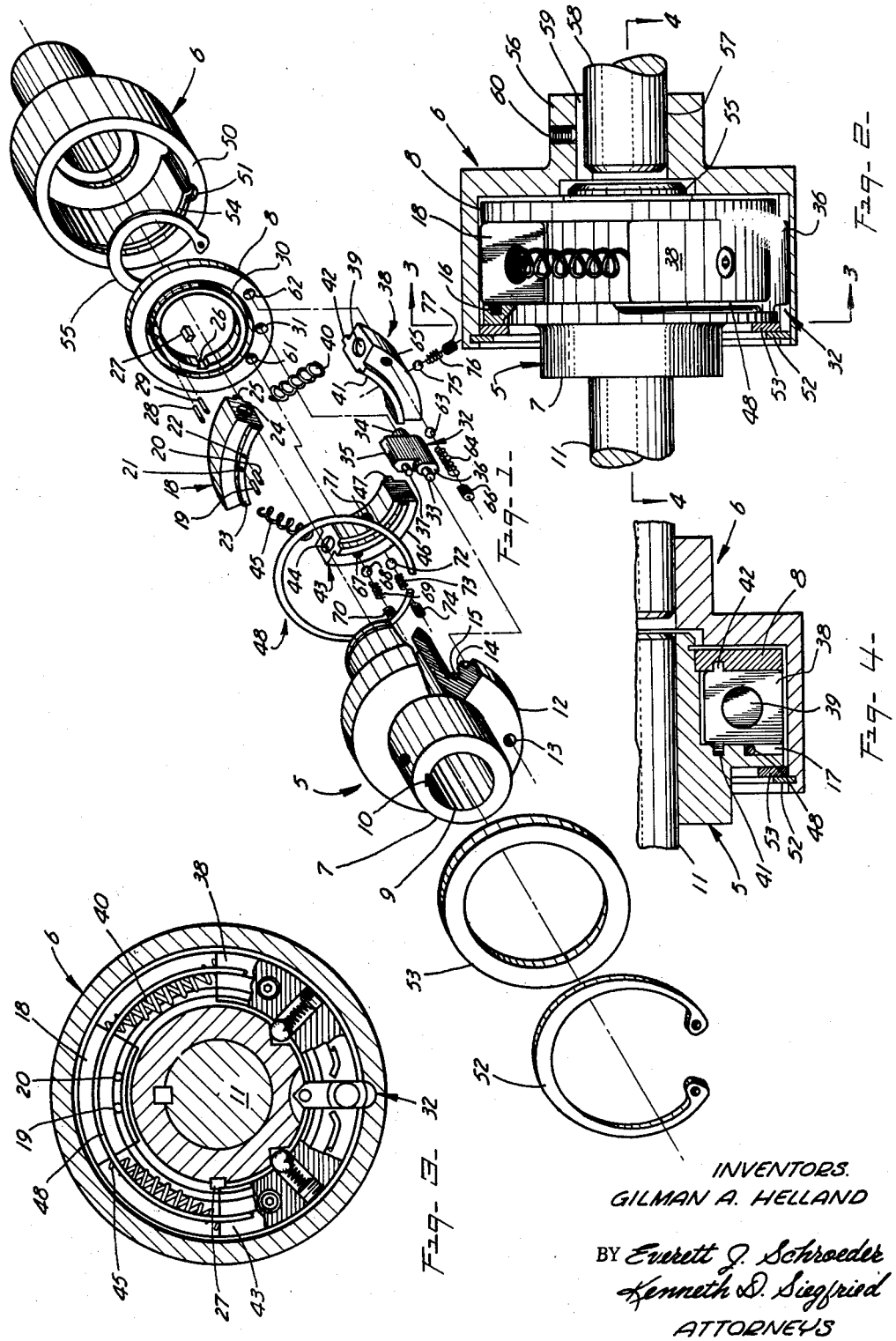

3,147,834
AUTOMATICALLY RESETTING HIGH TORQUE CLUTCH
Gilman A. Helland, Wayzata, Minn., assignor to Helland, Inc., Navarre, Minn., a corporation of Minnesota
Filed Sept. 26, 1962, Ser. No. 226,360
18 Claims. (Cl. 192—56)

This invention relates to torque clutches. More particularly, it relates to torque clutches of the type which will automatically reset themselves upon the withdrawal of the excessive torque applied to the driven member and which are designed for relatively high torque.

One of the primary difficulties in torque clutches as heretofore known has been the problem of accommodating needs for release at high torque without requiring a structure which is of undue size and which will release at accurately predetermined torque. Attendant with the size problem is the cost of manufacture which necessarily increases substantially as the size increases. Also involved is the need for a torque clutch which may be run for unusually long periods of time in released position without generating sufficient heat to cause permanent damage to the clutch device as well as the source of power and machine being driven thereby. Our invention is directed toward overcoming these problems.

While the torque clutch described and claimed in the above entitled application has proved outstandingly successful as a torque clutch wherein torques of lower ranges are involved, the problem of providing a torque clutch for torques of higher ranges without involving objectionable sizes is still present. The industry is still in need of a torque clutch designed to release at relatively high torque and capable of being run after release for long periods of time without heating, all without undue increase in size of the device. My invention as described and claimed herein provides a relatively inexpensive and highly efficient solution to this problem.

It is a general object of my invention to provide a novel and improved torque clutch of simple and inexpensive construction, operation and maintenance.

A more specific object is to provide a novel and improved torque clutch of relatively high torque capacity which is simple and inexpensive in construction, operation and maintenance and will operate in substantially friction-free relation upon release from driving position.

Another object is to provide a novel and improved torque clutch having a relatively high torque releasing point which is simple and inexpensive to construct and will automatically reset itself after having released itself from driving relation and upon the removal of the excessive torque and non-rotation of the driving members.

Another object is to provide a novel and improved high torque clutch of simple, inexpensive, and compact construction.

Another object is to provide a novel and improved high torque clutch of simple, inexpensive, and compact construction which will automatically reset itself in synchronized driving relation with the driven member after having released itself from driving relation and upon the removal of the excessive torque and non-rotation of the driving member.

Another object is to provide a novel and improved rotary torque clutch of simple and inexpensive construction which will release itself at only relatively high torques from driving relation upon the application of excessively high torque thereupon by the driven member and will thereafter remain in substantially friction-free non-driving relation until the excessive torque is removed and the driving member substantially ceases to rotate.

Another object is to provide a novel and improved rotary torque clutch of compact design for release at relatively high torques and utilizing a resiliently maintained driving connection between the rotary driving member and the rotary driven member and constructed and arranged to substantially entirely nullify the resilient urging upon the connecting member which establishes the driving connection, this nullification to take place as soon as the driving connection moves to non-driving position and so long as the driving member rotates rapidly and to re-establish the resilient urging upon such connecting member and the driving member ceasing to rotate.

These and other objects and advantages of my invention will more fully appear from the following description, made in connection with the accompanying drawings, wherein like reference characters refer to the same or similar parts throughout the several views, and in which:

FIG. 1 is an exploded perspective view of my torque clutch;

FIG. 2 is a side elevational view of the same with parts broken away to better illustrate the construction thereof;

FIG. 3 is a vertical sectional view taken along line 3—3 of FIG. 2; and

FIG. 4 is a fragmentary sectional view taken approximately along line 4—4 of FIG. 2 and showing one end of a shiftable segment in elevation.

One embodiment of our invention is shown in FIGS. 1–4 and includes a driving member indicated generally as 5 and a driven member indicated generally as 6. The driving member 5, as shown, includes a flanged tubular member 7 and a racing ring 8 which together, when assembled in conjunction with the other elements as hereinafter described, define a channel therebetween as best shown in FIG. 2. The tubular member 7 has a bore 9 extending therethrough and is provided with a keyway 10 adapted to fixedly secure the tubular member 7 to a driving shaft 11 of an electric motor (not shown) or a similar source of rotary power. The outwardly extending flange 12 of the tubular member 7 is provided with a pivot opening or journal 13 which extends therethrough.

The inner face of the flange 12 of the tubular member 7 is provided with an annular rib 14 which extends in a circumferential direction relative to the flange and is not continuous in the area adjacent the journal 13. This rib 14 forms an inner circumferentially extending channel or way 15. An axially extending peripheral flange 16 cooperates with the rib 14 to define a groove 17 therebetween. This peripheral flange 16 (best shown in FIG. 2) is also not continuous and in fact extends only substantially half way around the side of the flange opposite the journal 13.

Fixedly secured to a segment of the flange 12 at its inner face is a fixed arcuately shaped block or segment 18. This segment 18 is secured to the inner face of the flange 12 by a pair of pins 19 and 20 which are received in openings 21 and 22 formed in the side of the segment 18. These pins 19 and 20 are also received within openings (not shown) formed in the inner face of the flange 12 so that the segment 18 cannot rotate relative to the flange. An arcuately shaped laterally extending rib 23 fits within the way 15 to aid in holding the segment 18 in fixed relation. A recess such as the recess 24 is formed in each end of the fixed segment 18 for a purpose to be hereinafter defined. A second laterally extending arcuately shaped rib 25 is formed on the opposite side of the segment 18 relative to the rib 23.

The racing ring 8 as best shown in FIG. 1 is also provided with a keyway 26 and a key 27 which is utilized to key the ring 8 to the reduced end of the tubular member 7 as viewed at the right in FIG. 1. A pair of pins 28 and 29 are received within openings provided therefor in the racing ring 8 and within openings provided therefor within the side of the fixed segment 18 to fixedly secure the segment 18 to the ring 8, the rib 25 fitting within the annular way or groove 30 which is formed on the inner face of the ring. A pivot opening or journal 31 is also provided in the peripheral portions of the ring 8.

Pivotally mounted within the journals 13 and 31 is a toggle member indicated generally as 32. This toggle member 32 has a pair of journal pins 33 and 34 which extend laterally from opposite sides and are received within the journals 13 and 31, respectively. As best shown in FIG. 1, the toggle member 32 has a longer lever arm 35 and a shorter lever arm 36, the latter of which extends outwardly beyond the flange 12 of the tubular member 7 and outwardly beyond the ring 8. This can also be seen in FIG. 2. The shorter lever arm 36 is the portion of the toggle member 32 which performs the driving function by engaging the driven member 6. A reset pin 37 also extends laterally from the longer lever arm 35 of the toggle member.

Bearing against one side of the toggle element 32 is one end of an arcuately shaped segment or block 38. The end which bears against the toggle element is flat and extends radially relative to the curvature of the segment. The opposite end of the segment 38 has a recess 39 formed therein which is adapted to receive one end of a short coiled spring 40. The opposite end of the spring 40 is received within the recess 24 of the fixed segment 18. The spring 40 is of such length that it constantly urges the segment 38 against the longer lever arm 35 of the toggle member 32. At one side of the segment 38 there is an arcuately shaped rib 41 which extends outwardly. At the opposite side there is a second and similar rib 42. The rib 42 rides within the annular groove or way 30 of the ring 8. The rib 41 rides within the channel 15 of the tubular element 7 so that the segment 38 is capable of only circumferential movement relative to the two rotary members 5 and 6.

At the opposite side of the toggle 32 there is a second circumferentially shiftable segment 43 which has a radially extending end face bearing against the toggle element and has a recess 44 formed in its opposite end. The recess 44 is adapted to receive one end of a coiled spring 45 therein while the opposite end of the spring is received within the recess of the fixed segment 18 in an identical manner to that in which the spring 40 is received at the opposite end. The segment 43 has an arcuately shaped rib 46 at one of its sides and a second and similarly shaped and arranged rib 47 at its opposite side. The rib 47 is received within the groove or way 30 and the rib 46 extends into the way 15 so that the segment 43 may shift circumferentially of the tubular member 7 but only in that direction. The spring 45 is of such length as to constantly urge the segment 43 against the longer lever arm 35 of the toggle 32 as is the spring 40.

A resilient annular split ring 48 which is round in cross-sectional configuration and is normally smaller in diameter then the circumference of the rib 14 is snapped into place around the rib 14 so as to fit snugly therearound and have its free end positioned laterally of the longer lever arm 35 of the toggle 32 but in position to engage the reset pin 37 when the toggle member 32 shifts to a substantially circumferentially extending position. Normally the spring 48 does not engage any portion of the toggle member 32 but when the toggle member shifts to disengaging position such that the shorter lever arm 36 does not extend outwardly beyond the ring 8 or the flange 12, one of the free ends of the spring 48 will bear against the reset pin 37 and gently urge the toggle member 32 toward radially extending position again.

The driven member 6, as shown, consists of a cup-shaped member 50 which has an axially extending groove 51 formed in its inner surface and adapted to receive the shorter lever arm 36 of the toggle member 32 therein.

As best shown in FIG. 2, the driven member 6 encircles the driving member 5 and is secured thereto by a snap ring 52 which bears against a washer 53 and snaps into a groove 54 formed on the inner surface of the cup-shaped member 50. A similar but smaller snap ring 55 also snaps into place on the outer end of the tubular member 7 as best shown in FIG. 2 to additionally lock the ring 8 to the tubular member 7 and thereby cause it to define the necessary channel within which the movable segments 38 and 43 move concentrically of the driving member 5 and the driven member 6.

The driven member 6 has a hub 56 at its end opposite the cup-shaped element which is provided with a bore 57 adapted to receive a driven shaft 58 therein and to be secured thereto by a key 59 held in place by a set screw 60.

The ring member 8, as best shown in FIG. 1, is provided with a pair of recesses 61 and 62 in its lateral surface. It will be noted that one of these recesses is disposed at each side of the journal 31 and the toggle 32 and is adapted to receive the ball portion of a ball detent therein. These recesses 61 and 62 constitute part of ball detent means which includes a ball 63 urged into the recess 62 by a spring element 64. The ball 63 and the spring 64 are disposed within an axial bore 65 in element 38 and is held in place therein by a threaded pin 66 which is threaded into the bore 65 to cause the spring 64 to constantly urge the ball 63 into the recess 62 or against the side of the ring 8, depending upon the position of the segment 38.

The segment 43 is similarly provided with an axially extending bore 67 which accommodates a ball 68 and a spring 69 held in place by a threaded pin 70 which is threaded into the bore 67. The ball 68 is disposed so as to extend into the recess 61 at the same time as the ball 63 extends into the recess 62 and the portion 36 of the toggle member 32 extends into the groove 51 of the driven member 6.

Each of the segments 38 and 43 is also provided with ball detent means extending radially thereof with the ball bearing against the outer surface of the tubular member 7 to the right of the flange 12 as viewed in FIG. 1. Thus, the segment 43 is provided with a radial bore 71 which accommodates a ball 72 urged radially inwardly by a spring 73 and held in position by a threaded pin 74 which is threaded into the bore 71 at its outer radial extremity. The bore 71 is positioned circumferentially relative to a recess (not shown) formed in the outer periphery of the reduced portion of the tubular member 7 shown at the right-hand end of that element in FIG. 1, the recess being of the type designated by the numerals 61 and 62 to complete radially extending ball detent means for holding the shiftable segments in the necessary position to maintain the toggle element 32 in driving position relative to the driven member 6.

The segment 38 is also provided with a radially extending bore therethrough (not shown) similar to the bore 71 and accommodating a ball 75 urged radially inwardly by a spring 76 and held in position by threaded pin 77. The spring 76 urges the ball 75 radially inwardly into a recess (not shown) provided for cooperating therewith in the outer surface of the reduced portion of the tubular member 7 shown at the right end of that member in FIG. 1.

It will be readily understood that, depending upon the level of torque at which the device is desired to be released, the ball detent means which extends axially and radially of the shiftable segments 38 and 39 may be utilized separately or in conjunction with each other. In other words, if the torque level at which the device is released is not too great, the torque clutch may be provided with only the radial or the axial extending ball detent means. When an unusually high torque release level is desired, the axial and radial ball detent means may be used in combination as shown in FIG. 1. Also, more than one of the radial or ball detent means may be used in combination with each other so long as they are spaced sufficiently far apart circumferentially of the segments 38 and 43 to exceed the extent of circumferential shifting movement of the segments.

When the unit hereinbefore described is assembled as shown in FIGS. 2 and 3 it will be readily seen that the two circumferentially shiftable segments 38 and 43 normally urge the toggle 32 to a radially extending position relative to the two co-axially assembled driving and driven members 5 and 6 respectively. Also, the ball detent means which extends axially as well as that which extends radially functions to hold the shiftable segments 38 and 43 in such position. Because of the length of the longer lever arm 35 a substantial amount of torque is required to cause the shorter lever arm 36 to swing out of the groove 51 of the cup-shaped member 50 to a non-driving position. The amount of torque required is increased substantially by the presence of the axial and/or radial ball detent means for the force exerted by this ball detent means must be overcome in order to shift one of the segments circumferentially. It will be readily appreciated that the torque at which the clutch will release can be predetermined by varying the length of the lever arm 35, the length of the circumferentially shiftable segments 38 and 43, or by varying the length or strength of the springs 40 and 45 as well as the strength of the radially extending and axially extending ball detent means. Similarly, the fixed segment 18 may be made longer or shorter to provide the desired effect. It is a relatively simple matter, however, as is well understood in the art, to correlate these aspects or features of the various elements so that the clutch will release at a predetermined torque exerted by the driven member 6.

It will also be readily appreciated that the use of the axially extending and/or radially extending ball detent means provides a much greater range in torque requirements to cause the device to disengage with units having the same mass. In effect, the ball detent functions to hold the shiftable segments in position to cause the toggle to be in driving position in cooperation with the springs 40 and 45 and the combined effects of the ball detent means and the urging of these springs must be overcome before the device will release.

It should be noted that the use of the ball detent means extending axially and/or radially in cooperation with the springs 45 and 40 enables my torque clutch to have a release point at a higher level of torque than would otherwise be possible while still eliminating substantially all friction while the device is in released position. The only friction present in my device is that supplied by the action of the weak spring member 48 upon the pin 37. It should also be noted that the accuracy of the level at which my torque clutch releases is not reduced through the usage of the ball detent means for such accuracy is maintained through the use of the relatively weak spring members 40 and 45, the urging of which is added to the retaining force of the ball detent means. Thus, in order to cause the toggle element to move to non-driving position, the torque load must exceed the resistance offered by the ball detent means against shifting of the segments 38 and 43 plus the added urging of the springs 40 and 45.

When the predetermined torque has been exceeded, the shorter lever arm 36 will be caused to swing in the direction in which the torque is applied by the driven member 6 or, conversely, the longer lever arm 35 will swing in the direction in which the torque is applied by the driving member 5. When this occurs the toggle member 32 will force the circumferentially shiftable segments 38 and 43 outwardly relative to the toggle member. The toggle member will then assume a position such that the shiftable segments 38 and 43 will be working against one another and a pressure applied by each will be working against the pivot pins 33 and 34 of the toggle member and will tend to nullify each other, thereby substantially nullifying the entire urging of the shiftable segments 38 and 43. When in this position, of course, the ball detent means applies no urging against the segments 38 and 43 toward the position where the toggle element is in driving position. Because the urging of the segments 38 and 43 as well as the ball detent means have been nullified, there is no tendency by the toggle member 32 to return to radially extending position relative to the members 5 and 6 and hence the device can continue to rotate without any appreciable friction between the driving member 5 and the driven member 6. Because of this friction-free arrangement, it is possible for such a unit to run for many hours without any damage thereto and without any appreciable wear upon the groove defining edges of the groove 51. As a result a torque clutch of this construction will maintain its accuracy throughout prolonged periods of usage and despite frequent disengagement caused by overloading. I have found that a clutch of this construction can run for many hours with the driving element 32 in non-driving position without any serious damage to the clutch and, of course, without any danger to the source of rotary power or the device driven thereby. When the speed of the driving member 5 is reduced such that it approaches a stopped position, this clutch will automatically reset in synchronized position with the driven element 6 for when the toggle 32 shifts to non-driving position such that its ends are substantially aligned with the axis of pivot thereof and between the ends of the shiftable segments 38 and 43, the reset pin 37 will engage one of the free ends of the spring 48. This spring 48 is relatively weak as compared to the resilient urging applied to the shiftable segments 38 and 43 by the springs 40 and 45 but it is sufficient that it will urge the toggle member 32 back toward radially extending position when the driving member ceases to rotate or approaches a substantially non-rotating position. Thus it will be readily seen that the only force tending to urge the shorter lever arm into engagement with the groove 51 of the driven member 6 when the toggle member is in non-driving position is the relatively light urging of the spring 48 against the reset pin 37. The extent of this urging is so slight that no damage will result to the groove defining portions of the groove 51 despite prolonged rotation with the toggle element in non-driving position and yet it is sufficient such that when the driving member 5 ceases to rotate and the toggle element moves around to a position opposite the groove 51, the toggle element will be moved to radially extending position. Immediately upon returning to radially extending position, the relatively strong urging of the segments 38 and 43 will again come into play for they will snap into their original positions whereat the ends thereof abut against the longer lever arm 35 of the toggle member. Simultaneously, the radially extending and the axially extending ball detent means will snap into releasable locking position.

It will be noted that the shiftable segments 38 and 43 as well as the fixed segment 18 are positioned such that they do not bear against the inner surface of the cup-shaped member 50 and they do not extend outwardly as far as the periphery of the ring 8 or the flange 12. Likewise it will be noted that because of the coaxial arrangement and the relative size of these members, the flange member 12 and the ring 8 do not bear against the interior surface of the cup-shaped member 50. This arrangement provides for substantially friction-free rotation when the toggle member 32 has been moved to non-driving position whereat the opposed urging of the shiftable segments 38 and 43 are substantially completely nullified.

From the above it can be seen that I have provided a torque clutch which can be constructed to release at a predetermined torque at a relatively high level and which, upon release, moves immediately into substantially friction-free condition such that the driving member may rotate freely relative to the driven member without any damage thereto and without damage to the source of driving power. A device such as this is highly desirable in that it avoids the burning out of the source of electric power such as an electric motor resulting from heating and locking of the clutch and also avoids serious damage to the portions of the driven member which are engaged by the inner connecting or driving element. Consequently a clutch constructed in accordance with my invention can disengage at a relatively high level of torque and the driving member can continue to rotate throughout a prolonged period (such as overnight) without any damage to either the clutch or the source of power and permitting simple and automatic resetting of the same by merely stopping the source of rotary power, removing the source of overload, and permitting the device to reset itself. It will be noted that when the device does reset it is automatically in synchronized relation. This is important in machines whereone function of a large machine is timed relative to another.

It will be noted that the spring 48 is entirely separate from the resilient urging means or springs 40 and 46 which bear against the shiftable segments 38 and 43 and entirely separate from the axial and radial ball detent means exemplified by elements 61–77, inclusive. It will also be noted that this spring 48 does not come into play until such time as the action of the springs 40 and 45 and the ball detent means have been completely nullified.

It should also be noted that my torque clutch will operate accurately in either direction without adjustment thereof. In addition, it will automatically reset at the torque for which it was originally set regardless of the direction (clockwise or counterclockwise) in which the torque is applied. It will be readily appreciated that this high level torque clutch may be mounted in a large number of various arrangements such as in sprockets, gears, pulleys, propellers, etc.

One advantage of my high level torque clutch, in addition to the fact that it is relatively inexpensive and more compact, is that it provides a more positive fixed positioning of the relatively rotatable parts. In other words, more solid synchronization is possible because my high level torque clutch prevents rocking attendant with intermittent loads. This may be partially explained by the fact that the ball detent means carries the brunt of the load at relatively low levels while the springs 40 and 45 have their effect added to the holding effect of the ball detent means to prevent release of the device when sufficient torque is applied to overcome merely the ball detent means. My torque clutch also has an advantage in that the ball detent means used in cooperation with the shiftable segments 38 and 43 do not wear as rapidly as do ball detent means in torque clutches heretofore known since in my torque clutch the ball detent means do not constitute the connecting link between the two continuously relatively rotatable parts. In conventional torque clutches once the excessive torque is attained, the ball of the ball detent means repeatedly slips into and out of the confining groove until the excessive torque has been removed but in my torque clutch the ball detent means remains out of the cooperating recess continuously until such time as the excessive torque has been released and the clutch has been reset by substantially stopping the driving member.

It will, of course, be understood that various changes may be made in the form, details, arrangement and proportions of the parts without departing from the scope of my invention which consists of the matter shown and described herein and set forth in the appended claims.

What is claimed is:
1. A torque clutch comprising:
   (a) a rotary driving member,
   (b) a rotary driven member mounted for coaxial rotation relative to said driving member,
   (c) a torque transmitting element movably carried by one of said members and extending between said members and normally interconnecting the two in driving relation and being movable between driving and non-driving positions,
   (d) a resiliently urged holding member movable concentrically of said other members engaging said element and urging the same into interconnecting relation between said other members, said holding member being movable to permit said element to move to non-driving position when a predetermined torque toward non-driving position is exerted upon said element by said driven member, and
   (e) resilient mechanism carried by one of said members and connecting said holding member to one of said driven and driving members, and exerting its resilient forces in a direction extending axially of said members to cause said holding member to hold said element in driving relation to said driving and driven member.

2. The structure defined in claim 1 wherein said resilient mechanism is comprised of ball detent means carried by one of said driving and driven members and engaging said holding member.

3. The structure defined in claim 1 wherein said resilient mechanism also includes ball detent means carried by one of said members and extending and exerting its resilient forces in a direction extending radially of said members.

4. The structure defined in claim 1, wherein said resilient mechanism also includes spring means extending circumferentially of said members and engaging and urging said holding member in a direction circumferential of said driving and driven members and against said element to hold the latter in driving position relative to said driving and driven members.

5. The structure defined in claim 1 wherein said resilient mechanism also includes ball detent means carried by one of said members and extending and exerting its resilient forces in a direction extending radially of said members and also includes spring means extending circumferentially of said members and engaging and urging said holding member in a direction circumferential of said driving and driven members and against said element to hold the latter in driving position relative to said driving and driven members.

6. A torque clutch comprising:
   (a) a rotary driving member,
   (b) a rotary driven member mounted for coaxial rotation relative to said driving member,
   (c) a torque transmitting element movably carried by one of said members and extending between said members and normally interconnecting the two in driving relation and being movable between driving and non-driving positions,
   (d) a resiliently urged holding member movable concentrically of said other members engaging said element and urging the same into inter-connecting relation between said other members, said holding member being movable to permit said element to move to non-driving position when a predetermined torque toward non-driving position is exerted upon said element by said driven member, and
   (e) resilient mechanism carried by one of said members and connecting said holding member to one of said driven and driving members in held relation and exerting its resilient forces in a direction extending radially of said members to cause said holding member to hold said element in driving relation to said driving and driven member.

7. The structure defined in claim 6 wherein said resilent mechanism is comprised of ball detent means carried by one of said driving and driven members and engaging said holding member.

8. The structure defined in claim 6 wherein said resilient mechanism also includes spring means extending circumferentially of said members and engaging and urging said holding member in a direction circumferential of said driving and driven members and against said element to aid in holding the latter in driving position relative to said driving and driven members.

9. A torque clutch comprising:
   (a) a rotary driving member,
   (b) a rotary driven member mounted for coaxial rotation relative to said driving member,
   (c) a torque transmitting element movably carried by one of said members and extending between said members and normally interconnecting the two in driving relation and being movable between driving and non-driving positions,
   (d) resiliently urged holding means movable concentrically of said members engaging said element and urging the same into interconnecting relation between said members, said holding member being movable to permit said element to move to non-driving position when a predetermined torque toward non-driving position is exerted upon said element by said driven member, and
   (e) said holding means including resilient mechanism carried by one of said members and engaging said means and extending axially of said members and exerting its resilient forces in a direction extending axially of said members.

10. The structure defined in claim 9 wherein said members have adjacent opposed spaced surfaces rotatably relative to each other when said element is in non-driving position and said holding means being disposed in radially spaced relation to said surfaces and its effect on said element is substantially nullified when said element is in non-driving position to enable said members to rotate in friction-free relation when said element is in non-driving position.

11. The structure defined in claim 9 wherein said holding means is disposed in radially spaced relation to the interconnecting portion of said element when the latter is in driving position to enable said members to rotate in friction-free relation to each other when said element is in non-driving position.

12. The structure defined in claim 9 wherein said holding means and said element are constructed and arranged to nullify the urging of said means when in non-driving position to enable said members to rotate in friction-free relation when said element is in non-driving position.

13. A torque clutch comprising:
   (a) a rotary driving member,
   (b) a rotary driven member concentrically arranged with said driving member,
   (c) a driving element extending between said members and normally interconnecting the two in driving relation and being movable between driving and non-driving positions, and
   (d) resiliently urged means engaging said element and urging the same into interconnecting driving relation between said members,
   (e) said means including a pair of pressure transmitting elements shiftable only circumferentially of said members and disposed at opposite sides of said driving element,
   (f) said means including ball detent mechanism extending between and connecting in driving relation at least one of said pressure transmitting elements and one of said members, said mechanism extending axially of said members.

14. The structure defined in claim 13 wherein,
   (g) said means also includes ball detent means extending between and connecting in driving relation at least one of said pressure transmitting elements and one of said members,
   (h) said ball detent means extending radially of said members.

15. The structure defined in claim 13 wherein,
   (g) said means also includes spring means extending circumferentially of said members and disposed between one of said pressure transmitting elements and one of said members and urging said pressure transmitting element against said driving element to urge the latter into driving position.

16. The structure defined in claim 13 wherein,
   (g) said resiliently urged means also includes ball detent means extending between and connecting in driving relation at least one of said pressure transmitting elements and one of said members, and
   (h) said resiliently urged means also including spring elements extending circumferentially of said members and disposed between one of said pressure transmitting elements and one of said members and urging said pressure transmitting element against said driving element to urge the latter into driving position,
   (i) said ball detent means extending radially of said members.

17. The structure defined in claim 13 wherein,
   (g) said resiliently urged means is arranged relative to said element to permit said element to move to a non-driving position whereat the urging of said means is essentially nullified when a predetermined torque is exerted upon said element by said driven member, and
   (h) separate resilient and relatively weak means engaging said torque transmitting element and urging the same toward driving position between said members when said element is in non-driving position.

18. The structure defined in claim 17 wherein,
   (i) said separate relatively weak resilient means engages said element only when the latter is in non-driving position.

References Cited in the file of this patent

UNITED STATES PATENTS

| | | |
|---|---|---|
| 1,669,225 | Bayles | May 8, 1928 |
| 1,920,017 | McClatchie | July 25, 1933 |
| 2,253,466 | Grohn | Aug. 19, 1941 |
| 2,601,799 | Garwood | July 1, 1952 |
| 2,837,190 | Blakeslee | June 3, 1958 |
| 2,884,103 | Connell | Apr. 28, 1959 |

FOREIGN PATENTS

| | | |
|---|---|---|
| 291,593 | Italy | Dec. 21, 1931 |
| 848,588 | Germany | Sept. 4, 1952 |